June 21, 1960 R. L. SYLVESTER ET AL 2,941,686
SIDE LOADING TRANSFER DEVICE
Filed July 15, 1957 4 Sheets-Sheet 1

INVENTOR.
ROWLAND L. SYLVESTER.
THEODORE M. ARNOLD.
BY Eugene C. Knoblock
ATTORNEY

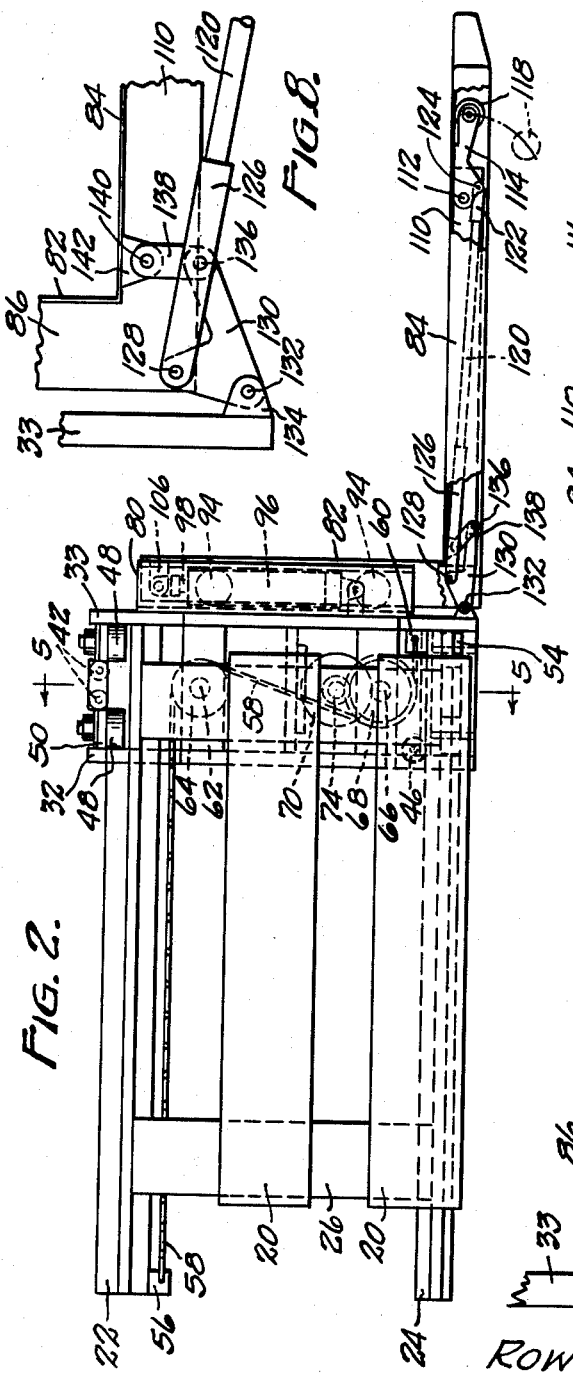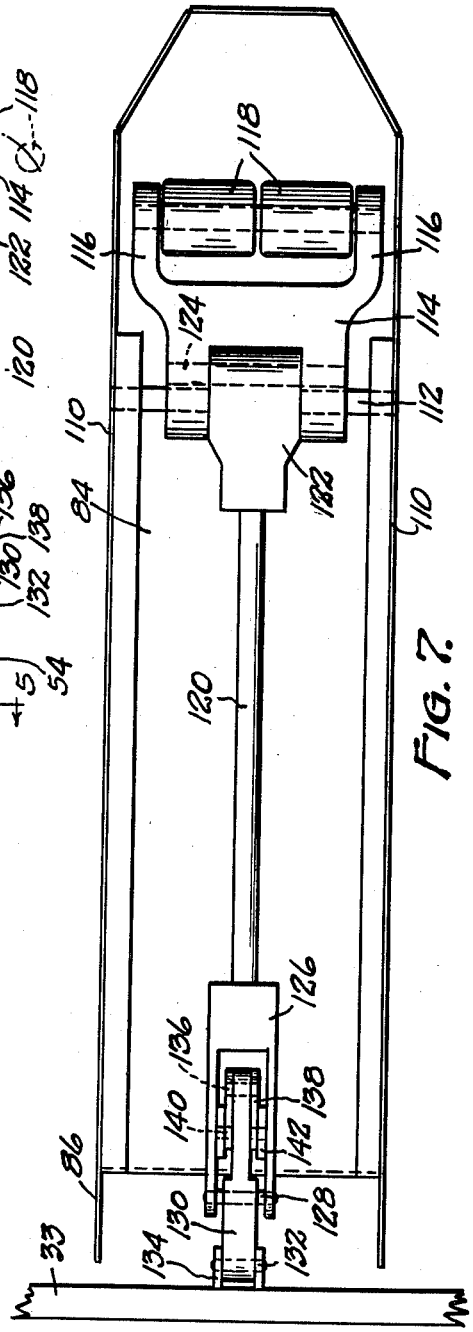

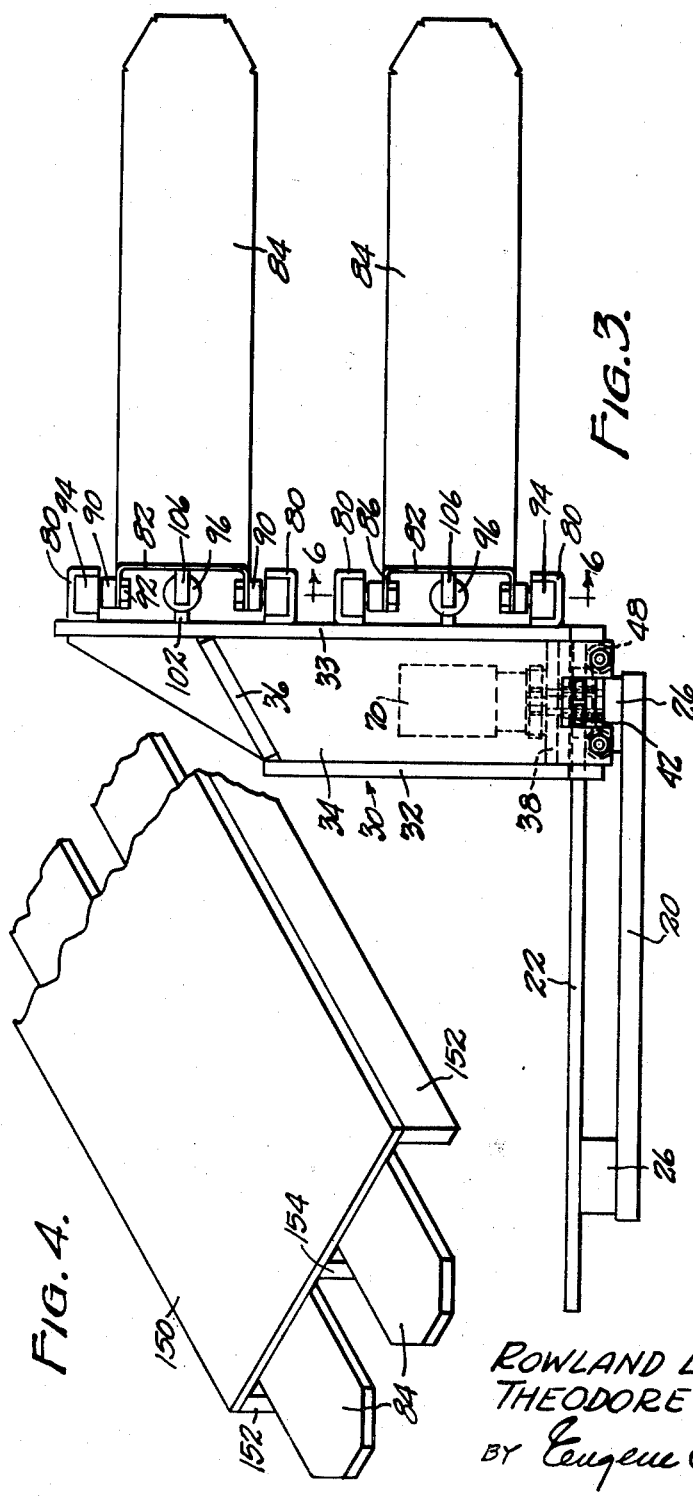

United States Patent Office 2,941,686
Patented June 21, 1960

2,941,686

SIDE LOADING TRANSFER DEVICE

Rowland L. Sylvester, South Bend, Ind., and Theodore M. Arnold, Kalamazoo, Mich., assignors to Rack Specialists, Inc., South Bend, Ind., a corporation of Indiana Filed July 15, 1957, Ser. No. 671,930

7 Claims. (Cl. 214—730)

This invention relates to improvements in side loading transfer devices. Examples of devices upon which the present device constitutes an improvement are shown in the patent application of Rowland L. Sylvester and Glenn N. Romine for Load Transfer Means for Lift Trucks, Ser. No. 401,478, filed December 31, 1953, now Patent No. 2,804,218, and the patent application of Robert E. Coash and Alonzo B. Kendall for Load Shifting Device, Ser. No. 478,836, filed December 30, 1954.

The primary object of this invention is to provide a device of this character which may be mounted upon a vehicle equipped with means for elevating and lowering a load so as to enable the device to be operated to project laterally relative to the vehicle to pick up and discharge a load located alongside the vehicle.

A further object is to provide a device of this character having forks adapted to shift endwise thereof and laterally from a vehicle and to be lifted and lowered relative to the vehicle for the purpose of picking up, carrying and depositing, at any desired station, a pallet carrying a load, wherein the said pallet is provided with a plurality of spaced parallel bottom load-supporting means between which the forks pass to accommodate stable support of the pallet thereon.

A further object is to provide a device of this character having a pair of laterally projecting forks and means for elevating and lowering the forks relative thereto and means correlated with said elevating means for supporting the free ends of said forks when in elevated position.

A further object is to provide a device of this character having a novel and simple attachment to a vehicle, elevating means to move transversely relative to said means and to said vehicle, for the purpose of carrying a load in substantially aligned position with the vehicle or for projecting said load laterally of the vehicle.

Other objects will be apparent from the following specification.

In the drawing:

Fig. 2 is a rear view of the device as viewed from the bottom in Fig. 3, with parts thereof broken away;

Fig. 3 is a top plan view of the device;

Fig. 4 is a fragmentary perspective view illustrating the manner in which the forks of the device engage a load-carrying pallet;

Fig. 7 is a bottom plan view of one of the forks of the device; and

Fig. 8 is a detail view illustrating one position of the operating mechanism of the device.

Figure 1:
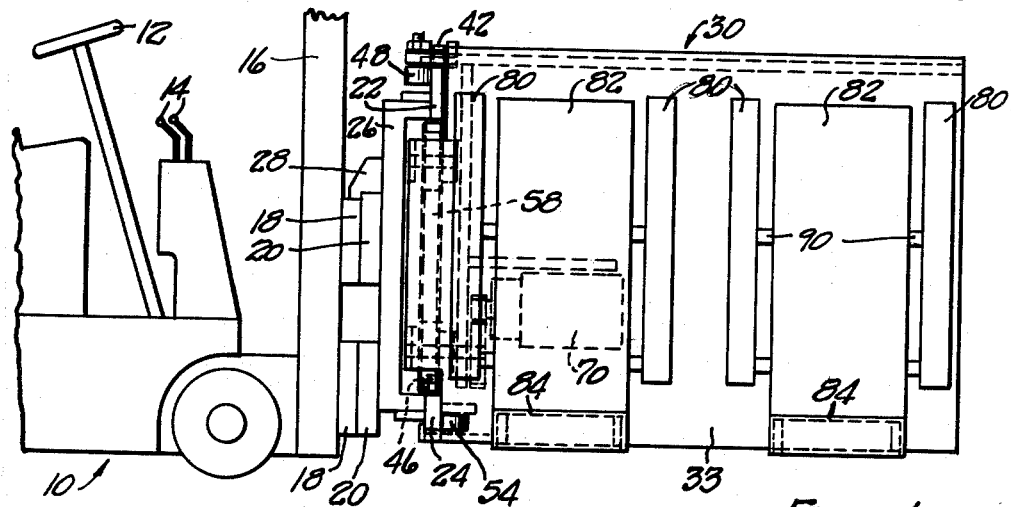
Fig. 1 is a side view of the device mounted upon a vehicle shown fragmentarily, wherein the device is positioned in low level position relative to the vehicle.

Referring to the drawings which illustrate the preferred embodiment of the invention, the numeral 10 designates a vehicle of the power-operated dirigible type provided with steering means 12 and suitable controls 14 for operating the same. The vehicle is also provided with vertical ways, such as a mast structure 16, adapted to be vertically traversed by carriage members 18 whose position upon the mast structure 16 is controlled by power-driven means (not shown) under the control of the operator of the vehicle. The vehicle 10 may be a vehicle of the type commonly known as a counterbalanced fork lift truck, and such vehicle has been selected here for purposes of illustration. It will be understood, however, that the device is not limited to application to a vehicle of this type and that the device may be applied to a vehicle having a frame constructed to position the elevating means 18 thereof between the front and rear vehicle wheels, instead of forwardly of the front wheels as occurs in connection with an application of the device to a fork lift truck. The members 18 preferably mount bars 20 which, in the conventional fork lift truck, constitute mounting bars for mounting the lift forks of the truck (not shown).

Figure 5:
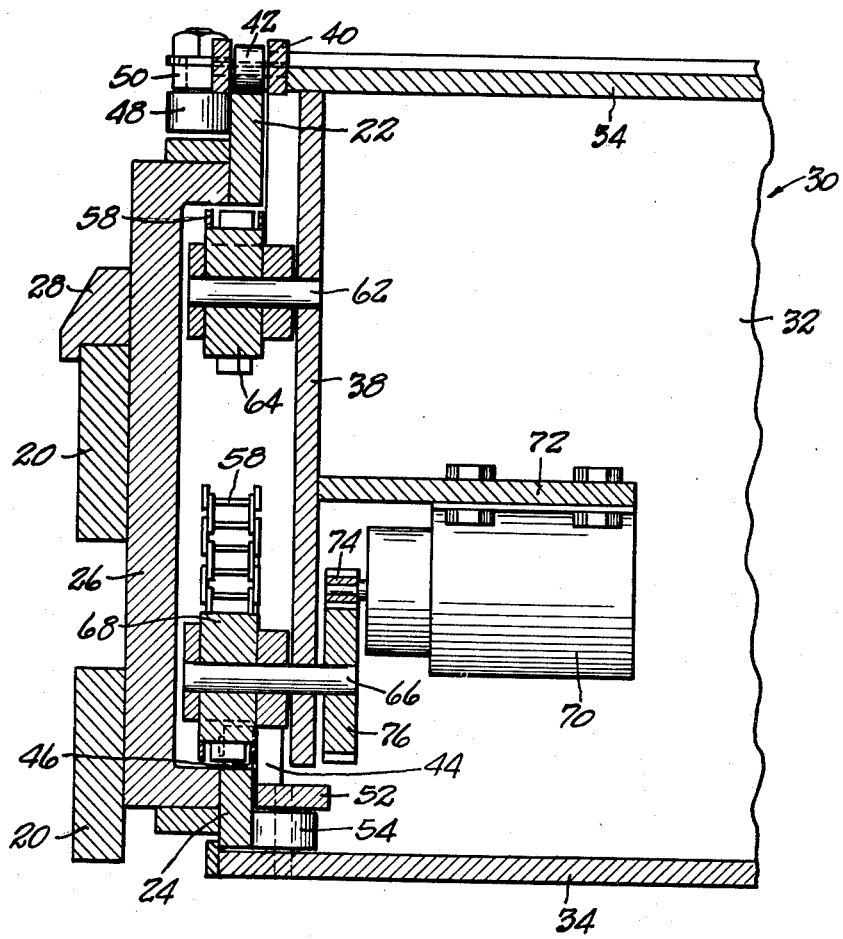
Fig. 5 is an enlarged vertical fragmentary sectional view taken on line 5—5 of Fig. 2.

The side loading transfer device has a pair of vertically spaced parallel rigid tracks 22 and 24 which are positioned horizontally in substantially the same vertical plane. The tracks 22 and 24 are interconnected by vertical bracket or spacer or frame members 26. The members 26 may include hook projections 28 engageable with the uppermost bar 20, as illustrated in Fig. 5, and preferably suitable means, such as machine screws (not shown), will be provided for securing the part 26 of the lowermost crossbar 20 on the elevating means of the vehicle. The tracks 22 and 24 will extend transversely and substantially full width of the vehicle and horizontally.

A rigid carrier 30 is mounted upon the tracks 22 and 24 to traverse the same. The carrier 30 is preferably fabricated from a plurality of rigid structural members and, as illustrated, includes substantially parallel side members 32 and 33 interconnected by cross-bracing members 34 or webs. The parallel members 32 and 33 interconnected by the webs preferably constitute rigid plates extending in a vertical plane, and in the cantilevered construction shown, the plate 33 may be longer than the plate 32 with the web extending between the free ends of the plates. Carrier 30 may also be reinforced by a vertical cross member 36. A transverse plate 38 reinforces the carrier 30 at one end thereof and is adapted to be positioned adjacent the tracks 22 and 24, as illustrated in Fig. 5.

The carrier 30 includes rigid parts 40 adjacent to the transverse plate 38, between which is journaled on a horizontal axis one or a set of rollers 42 which traverse the upper edge of the top track 22. The lower part of the carrier 30 has spaced parts carried thereby between which is journaled on a horizontal axis one or a set of rollers 46 to traverse the top edge of the lower track 24, as illustrated in Fig. 5. The rollers 42 and 46 are preferably out of vertical alignment, with the lowermost roller 46 being located adjacent to the plate 32 of the carrier, and the upper rollers 42, or at least one thereof, being located adjacent to the plate 33 of the carrier. One or a set of rollers 48 are journaled on the carrier 30 to traverse the side face of the track 22 opposite the face of said track which confronts the carrier 30, said roller 48 being journaled upon a projecting part of the frame of the carrier 30 on a vertical axis, as at projecting portion 50, seen in Fig. 2. One or more members 52 project from the web 34 or other portion of the carrier 30 at the lower inner end thereof and provide means for journaling on a vertical axis one or more rollers 54 which bear against the lower track 24 at the face thereof which confronts the carrier 30. The rollers 42, 46, 48 and 54 provide means for traversing the tracks and for supporting and positioning the carrier 30 as it traverses the tracks. By this means the friction entailed in movement of the carrier 30 from the position illustrated in Fig. 3 to a position located at the lefthand end of the track 22 is reduced. In this connection it will be understood that the tracks may be provided with suitable means (not shown) for limiting movement of the carrier, and, further, that the tracks 22 and 24 will be of such a length as to extend substantially full width of the vehicle 10.

Any suitable means may be provided for driving the carrier from one end to another of the tracks 22, 24. As here shown in Fig. 2, the upper track 22 has a projection 56 at one end thereof at which is fixedly anchored one end of a link chain 58. The opposite end of the link chain is anchored to a member 60 carried by the lower track 24. The chain 58 may be of any type, such as a roller chain, which is capable of sustaining great stress and of resisting stretching thereof. The plate 38 of the carrier mounts a stud 62, upon which is journaled a sprocket 64 around which the chain 58 is trained. The plate 38 also mounts or journals a shaft 66 on which is mounted a sprocket 68 around which the chain 58 is trained. Suitable means are provided for driving the shaft 66. As here shown, such means may include a drive motor 70 mounted upon a bracket 72 carried by the plate 38 of the carrier 30. The motor 70 will preferably be of the type having a speed reducing head (not shown). The shaft of the drive motor carries a pinion 74 which meshes with a gear 76 mounted on the shaft 66. The motor is of the reversible type so that it may be operated in either direction and it will be apparent that, upon operation thereof to drive the sprocket 68, the rotation of that sprocket will shift the carrier 30 along the tracks 22 and 24 by using the chain trained therearound similarly to a rack or for the purpose of a rack. In other words, since the ends of the chain 58 are anchored to the tracks, the chain cannot move lengthwise when it is taut. However, the chain can flex to pass around the sprockets 64 and 68 for engagement of said sprockets with progressive parts thereof to advance the carrier 30.

Figure 6:
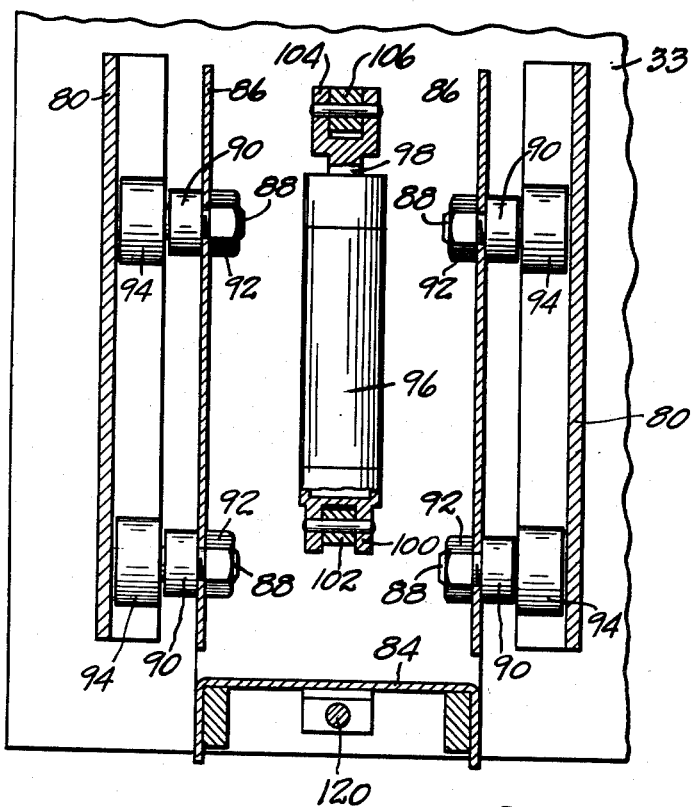
Fig. 6 is a vertical fragmentary sectional view taken on line 6—6 of Fig. 3.

The vertical plate 33 of the carrier 30 has mounted thereon two sets of confronting vertical channels 80, as illustrated in Figs. 1, 3 and 6. These channels may be welded or otherwise secured to the plate 33 in substantially symmetrical relation. The upright arms 82 of L-shaped fork members 84 are positioned between the guides 80 of the respective pairs. The fork parts 82 are preferably of channel shape in cross-section as seen in Fig. 3, and the opposite flanges 86 thereof have fixedly secured thereto stud shafts 88. Shafts 88 preferably have shoulders 90 intermediate their ends to bear against the outer faces of the channel flanges 86 and are screw-threaded to receive nuts 92 cooperating with flanges 90 to anchor the studs to the channel flanges 86. Each of the stud shafts 88 journals a roller 94 which is positioned within the adjacent chanel guide 80. At least two rollers 94 are carried by each flange 86 of each fork in vertically spaced relation to guide vertical movement of the fork relative to the channel guides 80.

Any suitable means may be provided for shifting the forks vertically in the guides 80. As here illustrated the power member consists of a cylinder 96 having a piston (not shown) therein whose stem 98 projects from one end thereof. The lower end of the cylinder 96 is preferably provided with forks 100 which straddle and are pivoted to a projection 102 fixed to the plate 33 of the carrier 30. The piston stem 98 may likewise be provided with a bifurcated portion 104 which is pivoted to a projection 106 fixed to the vertical part 82 of each fork. Suitable fluid conduits (not shown) will extend from the cylinder member 96 to a pump or other source of power, and a suitable control valve (not shown) will be provided therein and associated with a control 14 by means of which the operator may control the admission of fluid into cylinder 96 and withdrawal of fluid therefrom so as to produce vertical movement of the piston and its stem 98 relative to the carrier 30 for the purpose of raising and lowering the forks 82, 84. Where two power members 96 are provided, for individual operation of the respective forks, these power members will preferably be connected to a common fluid circuit for control by a single control element so as to insure equal and simultaneous operation of the two forks without requiring physical connection thereof.

The forks 84 include means located adjacent the free end thereof which are shiftable between a retracted position, as illustrated in Fig. 2, and an extensible position, as illustrated in dotted lines in Fig. 2, for the purpose of providing support for the free ends of the forks as they are elevated by the power member 96. The forks 84 are preferably of channel shape in cross-section and include downwardly projecting side flanges 110 which serve to journal a cross-shaft 112 adjacent the free end of the fork. A bracket 114 is pivoted on the cross-shaft 112 and extends toward the free end of the fork in the preferred form. The free end of the bracket 114 is bifurcated at 116 to mount a shaft upon which is journaled one or more rollers 118.

Suitable means are provided for swinging the bracket 114 between the full line position shown in Fig. 2 and the lowered dotted line position of the roller 118 shown in Fig. 2. This means may constitute the construction illustrated wherein an elongated rigid rod 120 has a head 122 pivoted at 124 to the bracket 114 spaced from the shaft 112. The opposite end of the rod 120 mounts a yoke 126 which is pivotally connected at 128 to an intermediate portion of lever 130. The lever 130 is pivoted at one end at 132 to ears 134 projecting from the lower end of the carrier plate 33. The lever 130 is also pivoted at its opposite end at 136 to a link or links 138 in turn pivoted at 140 to ears or brackets 142 projecting downwardly from the fork 84 adjacent to the upright portion 82 of the fork.

The operation of the device with respect to the projection and retraction of the roller 118 is substantially as follows: Whenever the fork units 82, 84 are elevated from the position shown in Fig. 2 and relative to the carrier 30 toward the position shown in Fig. 8, the lever 130 swings around the pivot 132 as its opposite end is elevated by virtue of its pivot connection 136 with link 138. This action causes a movement of the lever 130 to swing its pivot connection 128 with the rod 120 toward the carrier plate 33 to thereby pull endwise upon the rod 120. The endwise pull of the rod 120 is applied to the bracket 114 at the pivot point 124 spaced from the pivot 112 of the bracket and thereby swings the bracket 114 clockwise as viewed in Fig. 2 to lower the roller 118 to a position out of the outline of the fork 84, as illustrated in dotted lines in Fig. 2. The roller 118 is retracted into the outline of the fork 84 by a reverse operation whenever the fork units 82, 84 are lowered from the elevated position shown in Fig. 8 to their lowermost limit of travel, as illustrated in Fig. 2.

The forks 84 are adapted for use with pallets for mounting loads, said pallets being of any suitable character, such as that illustrated in Fig. 4, wherein the pallet constitutes a platform 150 supported on runners 152 extending substantially parallel to each other at the opposite sides thereof and on an intervening runner 154 preferably centrally thereof. Each of the fork arms will pass between a side support 152 and the center support 154 with clearance, as illustrated in Fig. 4. This clearance will be a vertical clearance as well as a lateral clearance.

In other words, when the rollers 118 are in the retracted position as illustrated in Fig. 2, the vertical dimension of the fork will be substantially less than the vertical dimension of the pallet parts 152, 154, so that the fork arms may pass freely between the platform 150 and the supporting surface, such as a floor, table top, or a rack, upon which the pallet is resting. The range of vertical movement of the fork arms 82, 84 by the power member 96 and the travel of the links and levers will be such that the rollers 118 will be lowered to bear upon the floor or other surface supporting the pallet while the fork arms are being raised to an extent to engage the platform 150 and bodily raise the pallet as a whole clear of the supporting surface. The fork arms 84, being cantilevered transversely of the carrier 30 and vehicle 10, thus secure support at their free ends, and rollers 118 may roll upon a supporting surface as the carrier is operated from the fork-projecting position shown in Fig. 3 to a fork-retracting position at which the fork arms 84 are positioned substantially within a projection of the opposite sides of the vehicle. Thus the rollers 118 provide means for supporting the transversely cantilevered forks 84 when the same are shifted laterally relative to the vehicle and eliminate need to counterbalance the vehicle transversely.

In the use of the device, assuming that it is mounted upon a vehicle equipped with load-elevating means, the device will normally assume a position with the tracks supported by the elevating means and extending transversely of the vehicle. The carrier 30 is normally positioned at the lefthand end of the tracks 22, 24 as viewed in Fig. 3, so that the forks 84 will be substantially within a projection of the sides of the vehicle for purposes of normal transport. When the vehicle so equipped is to pick up a load upon a pallet 150, 152, it is run alongside that pallet and the elevating means is operated to align the forks 84 with the spaces between the supports 152, 154 below the pallet platform 150. In this connection, the forks can be lowered to pick up a pallet resting on the floor on which vehicle 10 travels, and can be elevated to the full range of the lift means 18 of the vehicle. After the apparatus is positioned in alignment with the load, the carrier 30 is shifted along the tracks 22, 24 to position the forks 84 below the pallet, as illustrated in Fig. 4. The forks 84 will be located at the lower ends of the guides 80 during the lateral projection of the forks from the vehicle so that rollers 118 thereof will be retracted therein and the fork arms 84 will thus be of minimum vertical dimension.

When the fork arms 84 have been fully projected to extend under the pallet platform 150, the power member 96 is operated to elevate the fork arms relative to carrier 30 and thereby lower the rollers 118 into contact with the supporting surface adjacent to the pallet. Operation of power member 96 continues to the extent necessary to elevate the pallet bodily above that supporting surface. Thereupon, with the forks 84 in this position and the rollers 118 lowered, the carrier 30 is shifted to the opposite end of the tracks 22, 24. The rollers 118 traverse the surface which previously supported the pallet for the purpose of supporting the free ends of the fork arms until the forks and the load have been retracted within the outline of the sides of the vehicle, and thus relieve the vehicle from laterally unbalanced condition. The vehicle is then driven to the point or station at which the pallet and its load are to be delivered.

At this delivery station the elevating carriage 18 of the lift mechanism of the vehicle will be operated to locate the pallet and the forks at the elevation desired, i.e. at a position such that the fork rollers 118, while in lowered projected or load-supporting position, engage a supporting surface at the station at which the pallet is to be delivered. Thereupon the motor 70 is operated to project the carrier 30 and fork arms 84 toward the Fig. 3 position laterally of the vehicle with the weight of the load being taken in part by the rollers 118 as the rollers traverse the supporting surface. When the forks 84 have been fully extended, they are lowered relative to carrier 30 by operating the actuating member 96, thereby retracting the rollers 118 within the outline of the forks. The forks are lowered to an extent to lower the pallet onto the supporting surface and to free the forks from supporting engagement with the pallet. Thereupon the fork arms may be withdrawn from the space between the pallet parts 152, 154 by operating the motor 70 in a manner to shift the carrier 30 toward the lefthand end of the tracks 22, 24, i.e., to retracted or transport position.

It will be observed that in the construction illustrated the carrier 30 constitutes a cantilevered member supported at the end thereof adjacent its transverse wall 38 so that the load carried by the forks is cantilevered relative to the point of connection of the carrier 30 with the vehicle, that is, with respect to the tracks 22 and 24. Multiple rollers, such as rollers 42, 46, 48 and 54, transmit this cantilevered force to the tracks 22 and 24 for adequate non-tilting support of the carrier 30. In other words, the carrier 30 remains in its horizontal position under load, and at the same time frictional resistance to movement thereof along the track while loaded is held at a minimum by reason of the nature and position of the various rollers 42, 46, 48 and 54 as anti-friction load-transmitting members.

The mechanism for propelling the carrier 30 upon the tracks 22 and 24, being carried by the carrier 30, provides for simple connection with a source of power, such as a battery carried by the vehicle 10. Thus a simple flexible electric conductor extending from the vehicle to the operating motor 70, which is of such a length as to accommodate the full range of vertical and lateral movement of the carrier 30 relative to the vehicle 10, is all that is required in the way of a connection to the motor 70. Obviously the controls for the motor 70 may be located upon the vehicle, as at 14, within the reach of the operator of the vehicle.

The use of the chain 58 as a flexible rack to be traversed by the power-driven sprocket 68 for the purpose of shifting the carrier 30 on the tracks has the advantages of strength, ease of control, accuracy of operation and control, minimizing of friction and wear, and avoidance of the application to the traversing mechanism of any substantial part of the weight or stress of the carrier 30 and the load carried thereby.

The mechanical connection of the mechanism for raising and lowering the fork rollers 118 with the power-operated means 96 for raising the forks themselves, simplifies the arrangement of the parts and the control thereof and provides coordination which facilitates rapid manipulation of the vehicle. By this means an operator of the vehicle is relieved from the responsibility of manually coordinating the elevation of the forks with the lowering of the rollers 118. Consequently, as the operator actuates the device he is only required to observe the elevation of the forks 84 with reference to the pallet 150 and with reference to the supporting surface from which the pallet is to be picked up or to which it is to be delivered, and to operate a single control to produce proper operation of the device.

While the preferred embodiment of the invention has been illustrated and described, it will be understood that changes in construction may be made within the scope of the appended claims without departing from the spirit of the invention.

We claim:

1. A device for transporting a load mounted on a pallet having spaced supports, comprising a vehicle, horizontal elongated track means extending transversely across said vehicle and shiftable vertically on said vehicle, power actuated means on said vehicle for elevating and lowering said track means, a rigid substantially horizontal carrier extending substantially perpendicularly to and shiftable lengthwise on said track means, power actuated means for shifting said carrier along said track means, a pair of substantially horizontal elongated rigid forks extending substantially perpendicularly to said carrier and substantially parallel to said track means in cantilevered relation to said carrier to engage said pallet between said pallet supports, the vertical dimension of said forks being less than the vertical dimension of said pallet supports, power actuated means for shifting said forks vertically on said carrier, vertically shiftable supporting means carried by the free end portions of said forks and normally retracted within said forks, and power actuated means for shifting said last named supporting means downwardly below said forks to a position wherein the lower part of said supporting means is spaced below the upper surface of said forks a distance greater than the vertical dimension of said pallet supports, said last named means being operable independently of said first named lift means.

2. A device for transporting a load mounted on a pallet having spaced supports, comprising a vehicle, horizontal elongated track means extending transversely across said vehicle and shiftable vertically on said vehicle, power actuated means on said vehicle for elevating and lowering said track means, a rigid substantially horizontal carrier extending substantially perpendicularly to and shiftable lengthwise on said track means, power actuated means for shifting said carrier along said track means, a pair of substantially horizontal elongated rigid forks extending substantially perpendicularly to said carrier and substantially parallel to said track means in cantilevered relation to said carrier to engage said pallet between said pallet supports, the vertical dimension of said forks being less than the vertical dimension of said pallet supports, vertically shiftable wheeled supporting means carried by the free end portions of said forks and normally retracted within said forks, and power actuated means independent of said first named lift means for simultaneously lifting said forks vertically on said carrier and lowering said wheeled supporting means relative to said forks to a supporting position with the lowermost part of said wheeled supporting means spaced below the top surfaces of said forks a distance greater than the vertical dimension of said pallet support, said forks being mounted on said carrier to support a load when said wheeled supporting means is retracted in said forks.

3. A device for transporting a load having spaced supports, comprising a vehicle, horizontal elongated track means extending transversely across said vehicle and shiftable vertically on said vehicle, power actuated means on said vehicle for elevating and lowering said track means, a rigid substantially horizontal carrier extending substantially perpendicularly to and shiftable lengthwise on said track means, power actuated means for shifting said carrier along said track means, a pair of substantially horizontal elongated rigid forks extending substantially perpendicularly to said carrier and substantially parallel to said track means in cantilevered relation to said carrier to engage said load between said supports, the vertical dimension of said forks being less than the vertical dimension of said load supports, vertically shiftable wheeled supporting means carried by the free end portions of said forks and normally retracted within said forks, and power actuated means independent of said first named lift means for simultaneously lifting said forks vertically on said carrier and lowering said wheeled supporting means relative to said forks to a supporting position with the lowermost part of said wheeled supporting means spaced below the top surfaces of said forks a distance greater than the vertical dimension of said load support, said forks being mounted on said carrier to support a load when said wheeled supporting means is retracted in said forks, and control means on said vehicle for selectively controlling each of said power actuated means.

4. A device for transporting a load having spaced supports, comprising a vehicle, horizontal elongated track means extending transversely across said vehicle and shiftable vertically on said vehicle, power actuated means on said vehicle for elevating and lowering said track means, a rigid carrier projecting substantially perpendicularly in cantilevered relation to said track means and shiftable lengthwise thereon, power actuated means for shifting said carrier along said track means, a pair of substantially horizontal elongated rigid forks extending substantially perpendicularly to said carrier and substantially parallel to said track means in cantilevered relation to said carrier to engage said load between said supports, the vertical dimension of said forks being less than the vertical dimension of said load supports, power actuated means for shifting said forks vertically on said carrier, vertically shiftable supporting means carried by the free end portions of said forks and normally retracted within said forks, and power actuated means for shifting said last named supporting means downwardly below said forks to a position wherein the lower part of said supporting means is spaced below the upper surface of said forks a distance greater than the vertical dimension of said load supports, said last named means being operable independently of said first named lift means.

5. A device for transporting a load having spaced supports, comprising a vehicle, horizontal elongated track means extending transversely across said vehicle and shiftable vertically on said vehicle, power actuated means on said vehicle for elevating and lowering said track means, a rigid carrier projecting substantially perpendicularly in cantilevered relation to said track means, anti-friction rollers journaled transverse of said track means for anchoring said carrier shiftably on said track means, some of said rollers having vertical axes and others having horizontal axes, power actuated means for shifting said carrier along said track means, a pair of substantially horizontal elongated rigid forks extending substantially perpendicularly to said carrier and substantially parallel to said track means in cantilevered relation to said carrier to engage said load between said supports, the vertical dimension of said forks being less than the vertical dimension of said load supports, power actuated means for shifting said forks vertically on said carrier, vertically shiftable supporting means carried by the free end portions of said forks and normally retracted within said forks, and power actuated means for shifting said last named supporting means downwardly below said forks to a position wherein the lower part of said supporting means is spaced below the upper surface of said forks a distance greater than the vertical dimension of said load supports, said last named means being operable independently of said first named lift means.

6. A device for transporting a load mounted on a pallet having spaced supports, comprising a vehicle, horizontal elongated track means extending transversely across said vehicle and shiftable vertically on said vehicle, power actuated means on said vehicle for elevating and lowering said track means, a rigid substantially horizontal carrier extending substantially perpendicularly to and shiftable lengthwise on said track means, a sprocket journaled on said carrier, a chain anchored at opposite ends thereof to spaced parts of said track means and trained around said sprocket, power actuated means mounted on said carrier for driving said sprocket, a pair of substantially horizontal elongated rigid forks extending substantially perpendicularly to said carrier and substantially parallel to said track means in cantilevered relation to said carrier to engage said pallet between said pallet supports, the vertical dimension of said forks being less than the vertical dimension of said pallet supports, power actuated means for shifting said forks vertically on said carrier, vertically shiftable supporting means carried by the free end portions of said forks and normally retracted within said forks, and power actuated means for shifting said last named supporting means downwardly below said forks to a position wherein the lower part of said supporting means is spaced below the upper surface of said forks a distance greater than the vertical dimension of said pallet supports, said last named means being operable independently of said first named lift means.

7. A device for transporting a load having spaced supports, comprising a vehicle, horizontal elongated track means extending transversely across said vehicle and shiftable vertically on said vehicle, power actuated means on said vehicle for elevating and lowering said track means, a rigid substantially horizontal carrier extending substantially perpendicularly to and shiftable lengthwise on said track means, a pair of spaced sprockets journaled on said carrier, a chain anchored at opposite ends thereof to spaced parts of said track means and trained around said sprockets, power actuated means mounted on said carrier for driving one of said sprockets, a pair of substantially horizontal elongated rigid forks extending substantially perpendicularly to said carrier and substantially parallel to said track means in cantilevered relation to said carrier to engage said load between said supports, the vertical dimension of said forks being less than the vertical dimension of said load supports, power actuated means for shifting said forks vertically on said carrier, vertically shiftable supporting means carried by the free end portions of said forks and normally retracted within said forks, and power actuated means for shifting said last named supporting means downwardly below said forks to a position wherein the lower part of said supporting means is spaced below the upper surface of said forks a distance greater than the vertical dimension of said load supports, said last named means being operable independently of said first named lift means.

References Cited in the file of this patent

UNITED STATES PATENTS

| | | |
|---|---|---|
| 2,359,493 | Schreck | Oct. 3, 1944 |
| 2,360,407 | Dunham et al. | Oct. 17, 1944 |
| 2,417,394 | Framhein | Mar. 11, 1947 |

FOREIGN PATENTS

| | | |
|---|---|---|
| 1,126,725 | France | Nov. 29, 1956 |